United States Patent
Rand

(10) Patent No.: US 7,100,597 B2
(45) Date of Patent: Sep. 5, 2006

(54) MODULAR BURNER/BLOWER SYSTEM AND METHOD

(76) Inventor: Tyler B. Rand, 2014 Tapia Way, Upland, CA (US) 91786

( * ) Notice: Subject to any disclaimer, the term of this patent is extended or adjusted under 35 U.S.C. 154(b) by 169 days.

(21) Appl. No.: 10/852,103

(22) Filed: May 25, 2004

(65) Prior Publication Data

US 2005/0263148 A1    Dec. 1, 2005

(51) Int. Cl.
*F24H 6/06* (2006.01)
(52) U.S. Cl. .................. 126/110 R; 126/99 R
(58) Field of Classification Search ........... 126/110 R, 126/99 R, 110 A, 110 D
See application file for complete search history.

(56) References Cited

U.S. PATENT DOCUMENTS

| | | | |
|---|---|---|---|
| 2,464,473 A | 5/1949 | Wessel | 415/213.1 |
| 2,798,660 A | 7/1957 | Flynn | 417/360 |
| 3,012,762 A | 12/1961 | Norris | 165/48.1 |
| 3,103,924 A | 9/1963 | Porter | 126/116 B |
| 3,140,706 A | 7/1964 | Block et al. | 126/110 R |
| 4,072,187 A * | 2/1978 | Lodge | 165/48.1 |
| 4,129,013 A * | 12/1978 | Hine, Jr. | 62/285 |
| 4,130,376 A | 12/1978 | Dietsche | 415/213.1 |
| 4,149,671 A | 4/1979 | Cagle | 236/11 |
| 4,646,817 A | 3/1987 | Van Ee | 165/76 |
| 4,960,102 A * | 10/1990 | Shellenberger | 126/110 R |
| 5,277,036 A | 1/1994 | Dieckmann | 62/291 |
| 5,309,892 A * | 5/1994 | Lawlor | 126/110 AA |
| 5,370,106 A | 12/1994 | Beck et al. | 126/110 R |
| 5,417,199 A | 5/1995 | Jamieson et al. | 126/110 AA |
| 5,437,263 A | 8/1995 | Ellingham et al. | 126/110 R |
| 6,126,436 A * | 10/2000 | Cabrera et al. | 431/114 |
| 6,474,329 B1 | 11/2002 | Sears et al. | 126/110 A |
| 6,662,590 B1 * | 12/2003 | Kamuf | 62/428 |
| 2002/0092516 A1 * | 7/2002 | Gierula et al. | 126/99 R |
| 2003/0084896 A1 | 5/2003 | Gierula et al. | 126/110 R |

FOREIGN PATENT DOCUMENTS

DE        33 03 125 A1    8/1984

* cited by examiner

*Primary Examiner*—Cheryl Tyler
*Assistant Examiner*—Michael J. Early
(74) *Attorney, Agent, or Firm*—Richard C. Litman

(57) ABSTRACT

A modular burner/blower system and method directed to an independently operable direct fired burner unit and an independently operable blower unit that are also configured to be interconnected to one another and to operate together. The direct fired burner unit includes a burner casing and a direct fired burner mounted within the burner casing. The blower unit includes a blower casing configured to interconnect with the burner casing and a blower mounted within the blower casing. The burner unit may be interconnected to the blower unit in a vertical or horizontal configuration and includes heating components and controls.

16 Claims, 4 Drawing Sheets

MODULAR BURNER/BLOWER SYSTEM AND METHOD

BACKGROUND OF THE INVENTION

1. Field of the Invention

The present invention relates to heating and ventilating systems, and particularly to a modular burner/blower system and method directed to an independently operable direct fired burner unit and an independently operable blower unit that are also configured to be interconnected to one another and to operate together.

2. Description of the Related Art

Spray booths, factories, plants, restaurants and other buildings in which work takes place that may contaminate the air with fumes, dirt, odors or solvents need exhaust systems to pump out the contaminated air. Unless an air make-up system is installed, the exhaust system alone will lower the air pressure in the structure. The resulting negative pressure carries a number of undesirable consequences, such as difficulty in opening doors, slamming doors shut, and drawing in dust and debris from outside the building as air rushes in through an open window or door, a particularly troubling effect in a painting or food-related environment.

An air make-up system is needed to blow in air (often filtered) from outside to stabilize the pressure inside in order to avoid these problems. However, an air make-up system introduces a new problem. At various times during the year the air from outside the building will offset the desired temperature of the air inside. In order to prevent this from happening, most air make-up systems include a built in heater to warm the air entering from outside the building during the cold winter months. Many include an air cooling system for the summer months as well.

These measures maintain comfortable temperatures inside, but the cost of the system increases anywhere from four to seven fold with the inclusion of a heating unit alone. In addition, many of the available heating systems use indirect fired heaters, or heat exchange systems to heat the air instead of the more efficient direct fired method. There is a need for a modular set of independently operable direct fired burner units and independently operable blower units which may be purchased on a unit-by-unit basis as the customer can afford to do so, but in which the units are designed to operate together, facilitating easy installation when future units are purchased.

The related art is represented by the following references of interest.

U.S. Patent Application Publication No. 2003/0084896 A1, published May 8, 2003 for Laurent Gierula et al. describes a multi-stage gas fired heat exchanger system with one or more heat transfer tubes. U.S. Pat. No. 2,464,473, issued Mar. 15, 1949 to John H. Wessel, describes a blower installation where a blower assembly is mounted on suitable track means including tracks which support the blower assembly in a positive manner while permitting ready installation and removal thereof. U.S. Pat. No. 2,798,660, issued Jul. 9, 1957 to Elwin E. Flynn, describes a mounting mechanism for a blower.

Additional related art includes U.S. Pat. No. 3,012,762, issued Dec. 12, 1961 to John W. Norris, that describes modular units for air heating, cooling, and ventilation systems. U.S. Pat. No. 3,103,924, issued Sep. 17, 1963 to Robert D. Porter, describes methods of installing floor furnaces and also to furnaces constructed to enable them to be readily assembled. U.S. Pat. No. 3,140,706, issued Jul. 14, 1964 to Leo Block et al., describes a horizontal air furnace that may readily lend itself to different attic arrangements and thus be capable of installation in crawl spaces in order to accomplish servicing of the unit.

Additional related art includes U.S. Pat. No. 4,130,376, issued Dec. 19, 1978 to Robert J. Dietsche, that describes a fan mounting arrangement of the type in which slide rails on the fan housing are received in sliding relation by track means underlying a base plate provided with an opening to register with the discharge opening of the fan. U.S. Pat. No. 4,149,671, issued Apr. 17, 1979 to Bunyan B. Cagle, describes a solid fuel furnace including a firebox disposed inside of a heating chamber through which air to be heated is passed. U.S. Pat. No. 4,646,817, issued Mar. 3, 1987 to Dirk Van Ee, describes the structure and construction of a frame and panels for an air to air heat exchanger.

Additional related art includes U.S. Pat. No. 5,277,036, issued Jan. 11, 1994 to John J. Dieckmann, that describes a modular air conditioning system with adjustable capacity that includes a cooling module, a heating module, and a blower module, and can be assembled in any of a plurality of configurations. U.S. Pat. No. 5,370,106, issued Dec. 6, 1994 to Scott A. Beck et al., describes a furnace of the type having a blower shelf with a blower attached to one surface and a heat exchanger unit located proximate a second surface thereof. U.S. Pat. No. 5,417,199, issued May 23, 1995 to Donald R. Jamieson et al., describes a combustion furnace which is convertible in the filed for upflow or downflow operaton.

Additional related art includes U.S. Pat. No. 5,437,263, issued Aug. 1, 1995 to Jeffrey R. Ellingham et al., that describes an upflow/downflow high efficiency furnace with means for mounting a secondary heat exchanger by use of a hinge member. U.S. Pat. No. 6,474,329 B1, issued Nov. 5, 2002 to Merle D. Sears et al., describes a one piece cell panel for a forced air furnace which is designed for ease of removal without the necessity of having to dismantle the furnace cabinet. Germany Patent Application Publication No. DE 33 03 125 A1, published Aug. 2, 1984, describes an air/water heat pump suitable for interior and exterior placement.

None of the above references, taken either singly or in combination, is seen to describe the instant invention as claimed. Thus a modular burner/blower system and method solving the aforementioned problems is desired.

SUMMARY OF THE INVENTION

The present invention is a modular burner/blower system and method that are directed to an independently operable direct fired burner unit and an independently operable blower unit that are also configured to be interconnected to one another and to operate together. The direct fired burner unit includes a burner casing and a direct fired burner mounted within the burner casing. The blower unit includes a blower casing configured to interconnect with the burner casing and a blower mounted within the blower casing. The burner unit may be interconnected to the blower unit in a vertical or horizontal configuration and includes heating components and controls.

Mounted within the burner casing are direct fired heating components and controls including a liquid-fluid conduit, a burner, profiling plates, and appropriate electrical conduits. The heating components and controls may include a transformer to provide 120V control power, an ignition transformer to produce a high voltage spark to ignite the burner, a high temperature limit control to shut off control of the burner when the temperature of discharge air exceeds safe operating levels, a discharge air sensor to monitor the temperature of discharge air, and an airflow switch to insure proper airflow during burner operation that shuts off the burner when the airflow is incorrect.

An outside air thermostat may be included to automatically turn the heater circuit on when the outside air temperature falls below a predetermined level, and other controls may include an air flow pressure probe, an inlet gas pressure port to enable measurement of inlet gas pressure when the burner is locked in high fire, a combination gas valve, a modulating gas valve to provide the desired discharge air temperature, a burner gas pressure port, a manual gas shut off valve, a temperature dial to enable users to adjust the discharge air temperature, an a starter/overload contactor to provide overload protection, etc.

Accordingly, it is a principal aspect of the invention to provide a modular burner/blower system or method that includes/provides an independently operable direct fired burner unit with a burner casing and a direct fired burner mounted within the burner casing, and an independently operable blower unit with a blower casing configured to interconnect with the burner casing, and a blower mounted within the blower casing.

It is another aspect of the invention to provide customers with a modular, direct fired air make-up system which may be arranged in a vertical or horizontal configuration.

It is a further aspect of the invention to provide customers with an economical way to handle pressurization problems while planning to upgrade to install a heating unit at some future point by providing a modular burner/blower system with independently functioning blower and burner units that do not require a pressurized heat exchange medium for indirect heat exchange.

Still another aspect of the invention to provide for a blower unit/burner unit combination having a burner unit that is easily connected to a previously installed blower unit of an air make-up system.

It is an aspect of the invention to provide improved elements and arrangements thereof in a modular burner/blower system for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
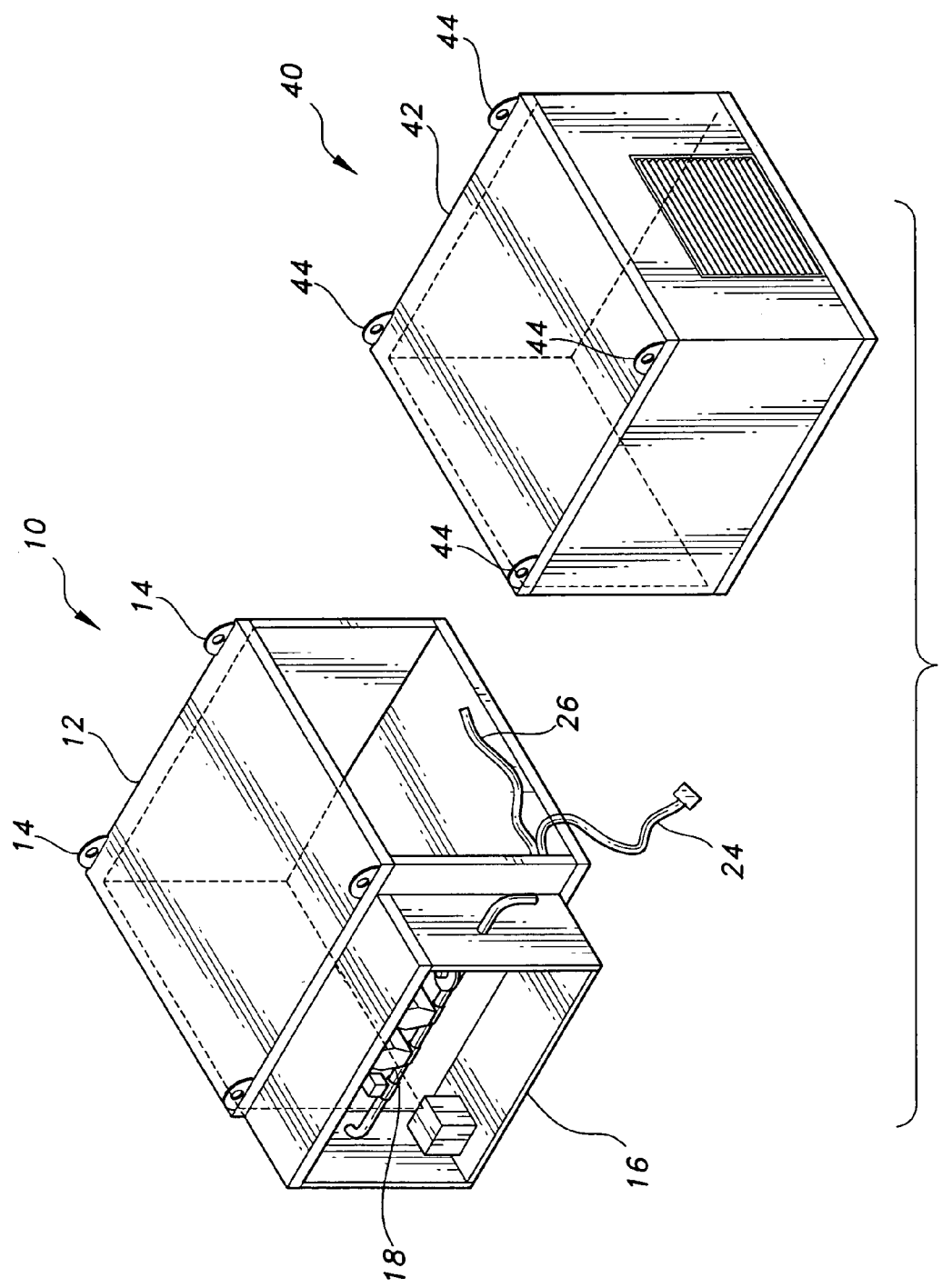
FIG. 1 is a perspective view of both units of a modular burner/blower system according to the present invention.

The present invention is a modular burner/blower system and method. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 2:
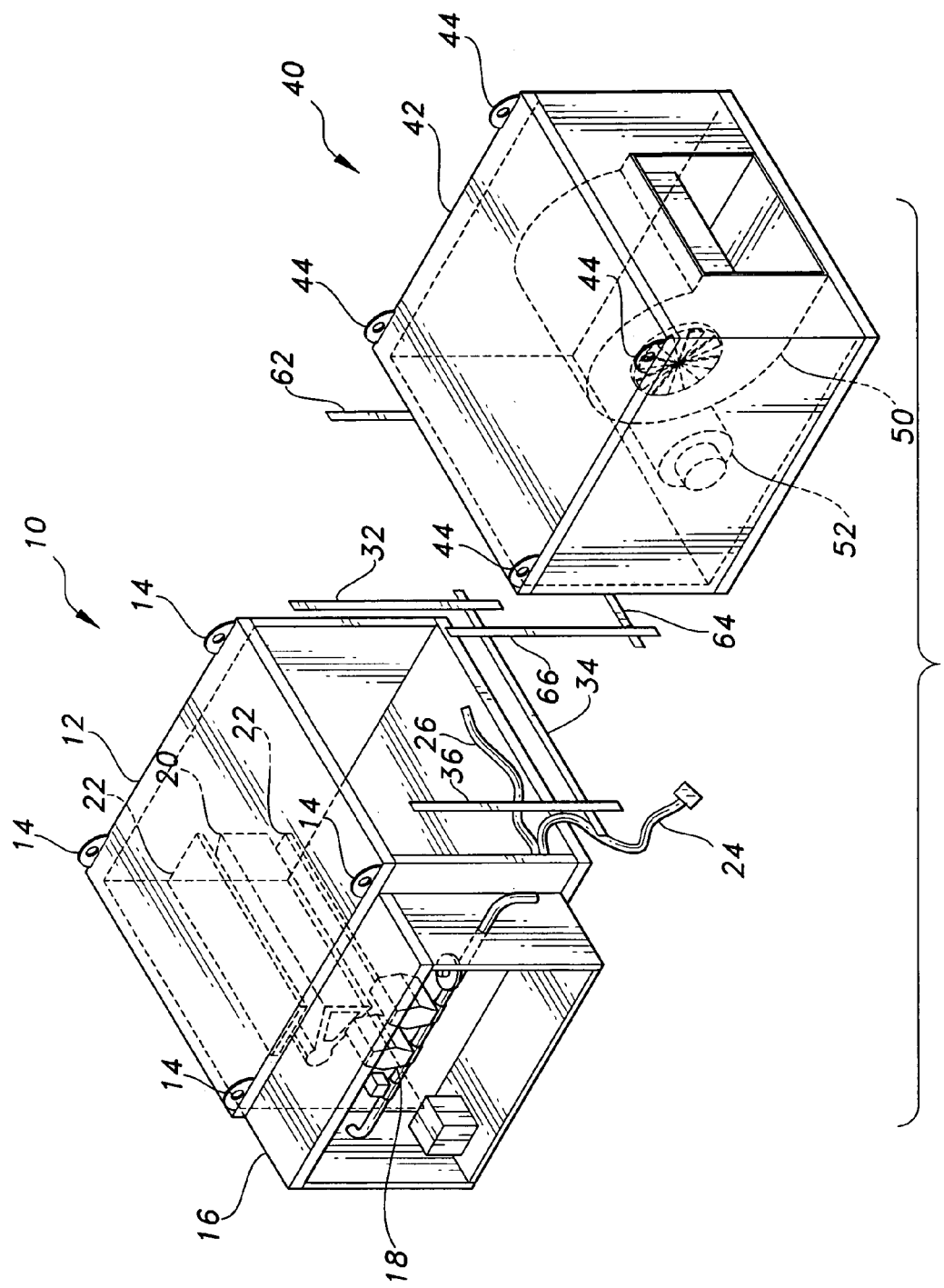
FIG. 2 is a diagrammatic, perspective view of both units of a modular burner/blower system according to the present invention, with the top wall and two adjacent sidewalls of the units in phantom to show interior layout of the units.

Referring to the drawings, FIGS. 1 and 2 show components of a modular burner/blower system according to the present invention. The modular burner/blower system includes a burner unit 10 and a blower unit 40. The burner unit 10 is independently operable and the blower unit 40 is independently operable. While the burner unit 10 is preferably configured for use with the blower unit 40, the burner unit 10 may be used with any particular airflow system that provides a predetermined flow of air through the burner unit 10.

The modular burner/blower system is configured to replace air in an air make-up system that is removed from a commercial building by an air exhaust system, and for heating the replacement air when a burner is installed. The burner unit 10 and the blower unit 40 are configured to be sold and shipped separately. However, the burner and blower units 10 and 40 are also configured to be interconnected to one another and to operate together.

The burner unit 10 is a direct fired burner unit and includes of a casing 12 with hoisting eyelets 14 and an electrical control box 16. The casing 12 is preferably formed from galvanized steel, may be powder coated, and may be configured with casing insulation and casing liners to prevent insulation fibers from being drawn into the air stream and discharged into conditioned space, and to prevent physical abuse and moisture damage to the insulation. As illustrated, the intake air opening is positioned on the left of the casing 12 opposite the discharge air opening on the right of the casing 12, but the casing 12 is configured to enable the discharge air opening to be rotated to any side of the casing 12.

Mounted within the burner casing 12 are direct fired heating components and controls including a liquid-fluid conduit 18, a burner 20, profiling plates 22, and appropriate electrical conduits 24 and 26. Fuel gas exits the liquid fluid conduit 18, is mixed with air flow being pulled over the burner 20, is combusted by the burner 20, and is discharged by the burner unit 10. The burner 20 is preferably a cast iron burner and its mixing plates are preferably stainless steel. The profiling plates 22 are preferably galvanized steel and do not touch the flame.

The direct fired method of heating employed by the burner unit 10 is a more efficient method of heating compared to heat exchange systems. The direct fired method heats the air directly with flame, instead of heating a liquid or gas, passing the heated liquid or gas through tubes, and passing the incoming air across the tubes, or alternatively, using an electric heater for heat exchange with the air. Less heat is wasted in a direct fired system, as the flame is blown directly into the air stream. In addition, constant heating and cooling of the heat exchanger causes indirect heat exchange systems to crack and leak hazardous by-products of combustion into the process air and are very costly to replace.

Mounted within the electrical control box 16 are controls for the burner unit 10 may include a transformer to provide 120V control power, an ignition transformer to produce a high voltage spark to ignite the burner 20, a high temperature limit control to shut off control of the burner 20 when the temperature of discharge air exceeds safe operating levels, a discharge air sensor to monitor the temperature of discharge air, and an airflow switch to insure proper airflow during burner operation that shuts off the burner when the airflow is incorrect. An outside air thermostat may be included to automatically turn the heater circuit on when the outside air temperature falls below a predetermined level, and other controls may include an air flow pressure probe, an inlet gas pressure port to enable measurement of inlet gas pressure when the burner is locked in high fire, a combination gas valve, a modulating gas valve to provide the desired discharge air temperature, a burner gas pressure port, a manual gas shut off valve, a temperature dial to enable users to adjust the discharge air temperature, an a starter/overload contactor to provide overload protection, etc.

The direct fired burner components 18, 20, and 22 eliminate the need for a pressurized heat exchange medium, permitting modular construction of the blower and burner units, as well as providing for more efficient heating of outside air drawn through the burner. The burner 20 is attached to the walls of the casing 12 by heavy gauge brackets. The electrical controls also include an electronic circuit board, are contained in an electrical control box. The burner unit 10 is independently operable and may be interconnected with a blower unit 40 via interconnecting spacer elements 34 and 36.

As with the burner unit 10, the blower unit 40 includes a casing 42 with hoisting eyelets 44. The casing 42 is preferably formed from galvanized steel, may be powder coated, and may be configured with casing insulation and casing liners to prevent insulation fibers from being drawn into the air stream and discharged into conditioned space, and to prevent physical abuse and moisture damage to the insulation. A blower 50 and a blower motor 52 are mounted within the casing 42. The blower may be any conventional blower, such as a basic squirrel cage fan with forward incline, or the like. Such blowers are conventionally known in the art, and will not be described in functional detail. The blower 50 may be secured to the blower casing 42 by attachment to an H-shaped frame. The blower casing 42 is preferably made of galvanized sheet metal, optionally powder coated, which makes the blower 40 appropriate for outdoor use.

The walls of the blower casing 42 may be made from eighteen gauge sheet metal, and contains a ten gauge frame to which the blower 50 is bolted. The blower casing 42 includes a mounting flange on the sidewall or top wall to which a prefilter can be mounted for independent operation as a standalone blower unit. When it is desired to interconnect and/or operate the burner unit 10 in combination with the blower unit 40, the prefilter is removed and the burner casing 12 may be bolted to the blower casing 42 on six inch centers all the way around the mounting perimeter.

The blower unit 40 may be sold, shipped and installed alone. The burner unit casing 12 and the blower unit casing 42 are of equal cross sectional dimensions and are designed to be bolted together should the customer decide to purchase and install either the burner unit 10 or the blower unit 40 at a later date.

When a burner/blower system according to the invention is configured by interconnecting an independently operable burner 10 to an independently operable blower unit 40 via interconnecting unit spacers 32, 34, 36, 62, 64, and 66, such a burner/blower system may be set in a oriented in a vertical or horizontal alignment, as desired.

Figure 3:
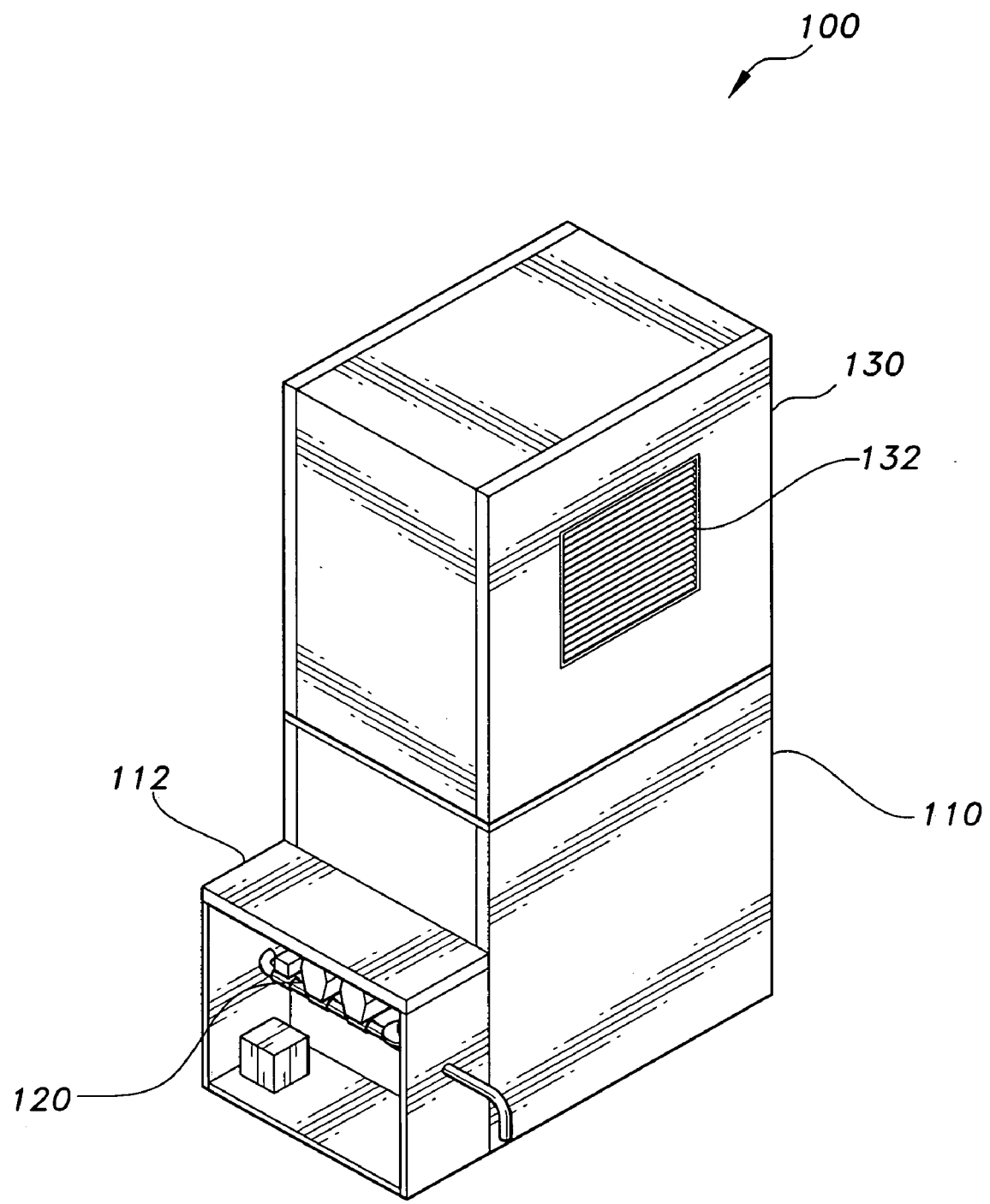
FIG. 3 is a perspective view of a modular burner/blower system with the blower and burner units attached to each other and stacked in a vertical configuration.

A vertically oriented burner/blower system 100 is shown in FIG. 3. The burner/blower system 100 includes a direct fired burner unit interconnected to a blower unit via spacer elements. The direct fired burner unit includes a casing 110, an electrical control box 112, and may include optional mounting elements (not shown). The blower unit includes a casing 130 and a discharge damper 132. The burner and blower casings 110 and 130 may be configured with casing insulation and casing liners to prevent insulation fibers from being drawn into the air stream and discharged into conditioned space, and to prevent physical abuse and moisture damage to the insulation. The blower casing 130 is configured to enable the discharge air opening to be rotated to any side of the casing 130. Mounted within the burner casing 110 are direct fired heating components and controls including a liquid-fluid conduit 120 and a base burner (not shown).

Figure 4:
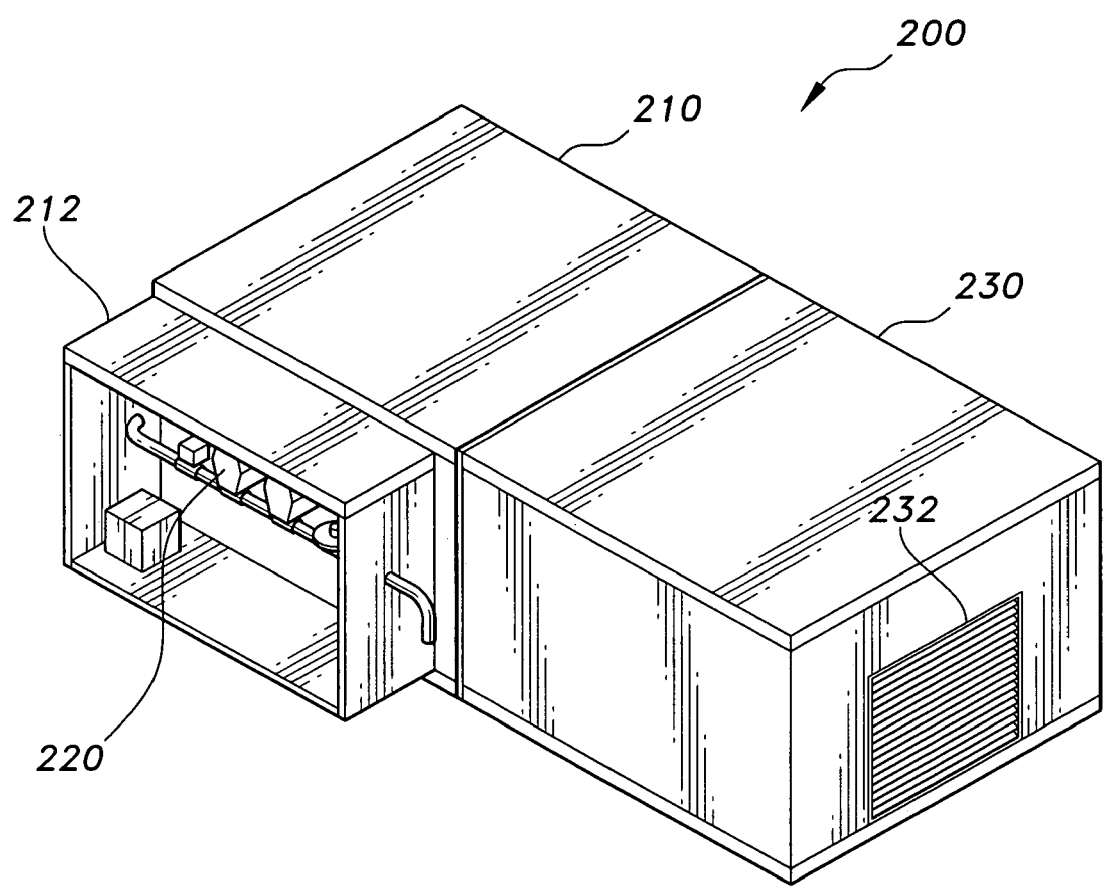
FIG. 4 is a perspective view of a modular burner/blower system with both the blower and burner units attached to each other and aligned in a horizontal configuration.

A horizontally oriented burner/blower system 200 is shown in FIG. 4. The burner/blower system 200 includes a direct fired burner unit interconnected to a blower unit via spacer elements. The burner unit includes a casing 210, an electrical control box 212, and may include optional mounting elements (not shown). The blower unit includes a casing 230 and a discharge damper 232. The burner casing 210 may be configured with casing insulation and casing liners to prevent insulation fibers from being drawn into the air stream and discharged into conditioned space, and to prevent physical abuse and moisture damage to the insulation. The blower casing 230 is configured to enable the discharge air opening to be rotated to any side of the casing 230. Mounted within the burner casing 210 are direct fired heating components and controls including a liquid-fluid conduit 220 and a burner (not shown).

Either one or both of the vertically and horizontally oriented burner/blower systems 100 and 200 may have controls including include a transformer to provide 120V control power, an ignition transformer to produce a high voltage spark to ignite the burner, a high temperature limit control to shut off control of the burner when the temperature of discharge air exceeds safe operating levels, a discharge air sensor to monitor the temperature of discharge air, and an airflow switch to insure proper airflow during burner operation that shuts off the burner when the airflow is incorrect. An outside air thermostat may be included to automatically turn the heater circuit on when the outside air temperature falls below a predetermined level, and other controls may include an air flow pressure probe, an inlet gas pressure port to enable measurement of inlet gas pressure when the burner is locked in high fire, a combination gas valve, a modulating gas valve to provide the desired discharge air temperature, a burner gas pressure port, a manual gas shut off valve, a temperature dial to enable users to adjust the discharge air temperature, and a starter/overload contactor to provide overload protection, etc.

The inventive modular burner/blower system is an air make-up combination that includes a blower unit and a burner unit that may be purchased separately, but which may be easily and quickly attached to each other to function together to replace air lost from a building through an air exhaust while heating air drawn into the building. The blower unit is capable of operating as an independent unit for simple replacement of air depleted by the exhaust without modification of air temperature, so that purchase of a more expensive burner unit may be deferred. The blower within the blower unit may be configured to blow horizontally or vertically. The burner unit casing is preferably of equal cross-sectional dimension and is configured to be attached to the blower unit casing.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A modular burner/blower system, comprising:
   (a) an independently operable direct fired burner unit comprising:
      (i) a burner casing; and
      (ii) a direct fired burner mounted within said burner casing; and
      (iii) heating components and controls including a discharge air sensor to monitor the temperature of discharge air, an airflow switch to insure proper airflow during burner operation that shuts off the burner when the airflow is incorrect, an outside air thermostat to automatically turn the heater circuit on when the outside air temperature falls below a predetermined level, an air flow pressure probe, an inlet gas pressure port to enable measurement of inlet gas pressure when the burner is locked in high fire, a combination gas valve, a modulating gas valve to provide the desired discharge air temperature, a burner gas pressure port, a manual gas shut off valve, a temperature dial to enable users to adjust the discharge air temperature, and a starter/overload contactor to provide overload protection; and
   (b) an independently operable blower unit comprising:
      (i) a blower casing configured to interconnect with the burner casing; and
      (ii) a blower mounted within the blower casing.

2. The modular burner/blower system according to claim 1, wherein said burner unit is interconnected to said blower unit in a vertical configuration.

3. The modular burner/blower system according to claim 1, wherein said burner unit is interconnected to said blower unit in a horizontal configuration.

4. The modular burner/blower system according to claim 1, wherein said blower casing is formed from galvanized steel.

5. The modular burner/blower system according to claim 1, wherein said heating components and controls include a liquid-fluid conduit.

6. The modular burner/blower system according to claim 1, wherein said heating components and controls include a transformer to provide 120V control power.

7. The modular burner/blower system according to claim 1, wherein said heating components and controls include an ignition transformer to produce a high voltage spark to ignite the burner.

8. The modular burner/blower system according to claim 1, wherein said heating components and controls include a high temperature limit control to shut off control of the burner when the temperature of discharge air exceeds safe operating levels.

9. A modular burner/blower method comprising:
   (a) providing an independently operable direct fired burner unit during a first transaction, the direct fired burner unit comprising:
      (i) a burner casing; and
      (ii) a direct fired burner mounted within said burner casing; and
      (iii) heating components and controls including a discharge air sensor to monitor the temperature of discharge air, an airflow switch to insure proper airflow during burner operation that shuts off the burner when the airflow is incorrect, an outside air thermostat to automatically turn the heater circuit on when the outside air temperature falls below a predetermined level, an air flow pressure probe, an inlet gas pressure port to enable measurement of inlet gas pressure when the burner is locked in high fire, a combination gas valve, a modulating gas valve to provide the desired discharge air temperature, a burner gas pressure port, a manual gas shut off valve, a temperature dial to enable users to adjust the discharge air temperature, and a starter/overload contactor to provide overload protection; and
   (b) providing an independently operable blower unit during a second transaction different from the first transaction, the blower unit comprising:
      (i) a blower casing configured to interconnect with the burner casing; and
      (ii) a blower mounted within the blower casing.

10. The modular burner/blower method according to claim 9, wherein said providing an independently operable direct fired burner unit step further comprises interconnecting said burner unit to said blower unit in a vertical configuration.

11. The modular burner/blower method according to claim 9, wherein said providing an independently operable direct fired burner unit step further comprises interconnecting said burner unit to said blower unit in a horizontal configuration.

12. The modular burner/blower method according to claim 9, wherein said providing an independently operable blower unit step further comprises forming said blower casing from galvanized steel.

13. The modular burner/blower method according to claim 9, wherein said providing said burner unit with heating components and controls step further comprises providing a liquid-fluid conduit.

14. The modular burner/blower method according to claim 9, wherein said providing said burner unit with heating components and controls step further comprises providing a transformer to provide 120V control power.

15. The modular burner/blower method according to claim 9, wherein said providing said burner unit with heating components and controls step further comprises providing an ignition transformer to produce a high voltage spark to ignite the burner.

16. The modular burner/blower method according to claim 9, wherein said providing said burner unit with heating components and controls step further comprises providing an independently operable blower unit further comprises providing said blower unit with heating components and controls step further comprises said heating components and controls include a high temperature limit control to shut off control of the burner when the temperature of discharge air exceeds safe operating levels.

* * * * *